United States Patent [19]

Tsai

[11] Patent Number: 5,363,284
[45] Date of Patent: Nov. 8, 1994

[54] AUTOMOBILE ROOF LAMP AND STOP LAMP ASSEMBLY

[76] Inventor: Wen Tsung Tsai, No. 58-3, Lane 410, Section 2, Wen Huan Rd., Baan Chyau, Taiwan, Prov. of China

[21] Appl. No.: 155,156
[22] Filed: Nov. 19, 1993
[51] Int. Cl.⁵ .......................... B60Q 1/26
[52] U.S. Cl. ................... 362/83.3; 362/74; 362/249
[58] Field of Search .......... 362/61, 80, 74, 83, 362/83.3, 243, 236, 249

[56] References Cited

U.S. PATENT DOCUMENTS 1,380,905  6/1921  Hines et al. ............. 362/83.3 X
1,937,724  12/1933  Somers ................... 362/83.3
3,487,360  12/1969  Thompson ................ 362/74 X Primary Examiner—Stephen F. Husar
Attorney, Agent, or Firm—Jacobson, Price, Holman & Stern

[57] ABSTRACT

An automobile roof lamp and stop lamp assembly includes a roof lamp unit fastened inside a lamp case within a reflector and covered by lens retained to the lamp case by a rim, and a stop lamp unit mounted on a mounting plate fastened to the lamp case at the back and covered within a transparent lamp shade, whereby the roof lamp unit is turned on to give light as the automobile is started; the stop lamp unit is triggered to give a visual warning signal as the brake pedal of the automobile is pressed.

1 Claim, 2 Drawing Sheets

AUTOMOBILE ROOF LAMP AND STOP LAMP ASSEMBLY

BACKGROUND OF THE INVENTION

The present invention relates to automobile lamps and, more particularly to an automobile roof lamp and stop lamp assembly, includes a roof lamp and a stop lamp fastened to the lamp case of the roof lamp.

Various roof lamps and third stop lamps are known, and widely used in automobiles. As these lamps are separately made, it is expensive to equip an automobile with a roof lamp and a third stop lamp. Further, a jeep is commonly installed with a roof lamp before it is put on the market. However, few jeep manufacturers equip their jeeps with third stop lamps before they are put on the market. Therefore, it will be extremely dangerous when driving at night without a third stop lamp.

SUMMARY OF THE INVENTION

The present invention has been accomplished under the aforesaid circumstances. The principal object of the present invention is to provide a lamp assembly for an automobile which combines a roof lamp and a stop Lamp into a roof lamp and stop lamp assembly. The another object of the present invention is to provide an automobile roof lamp and stop lamp assembly which is inexpensive to manufacture. According to the preferred embodiment of the present invention, the automobile roof lamp and stop lamp assembly comprises a roof lamp unit fastened inside a lamp case within a reflector and covered by lens retained to the lamp case by a rim, and a stop lamp unit mounted on a mounting plate fastened to the lamp case at the back and covered within a transparent lamp shade. The lamp case has a mounting device at the bottom fastened to the roof of an automobile. The roof lamp unit is turned on to give light as the automobile is started. The stop lamp unit is triggered to give a visual warning signal as the brake pedal of the automobile is pressed.

DETAILED DESCRIPTION OF THE PREFERRED EMBODIMENT

Figure 1:
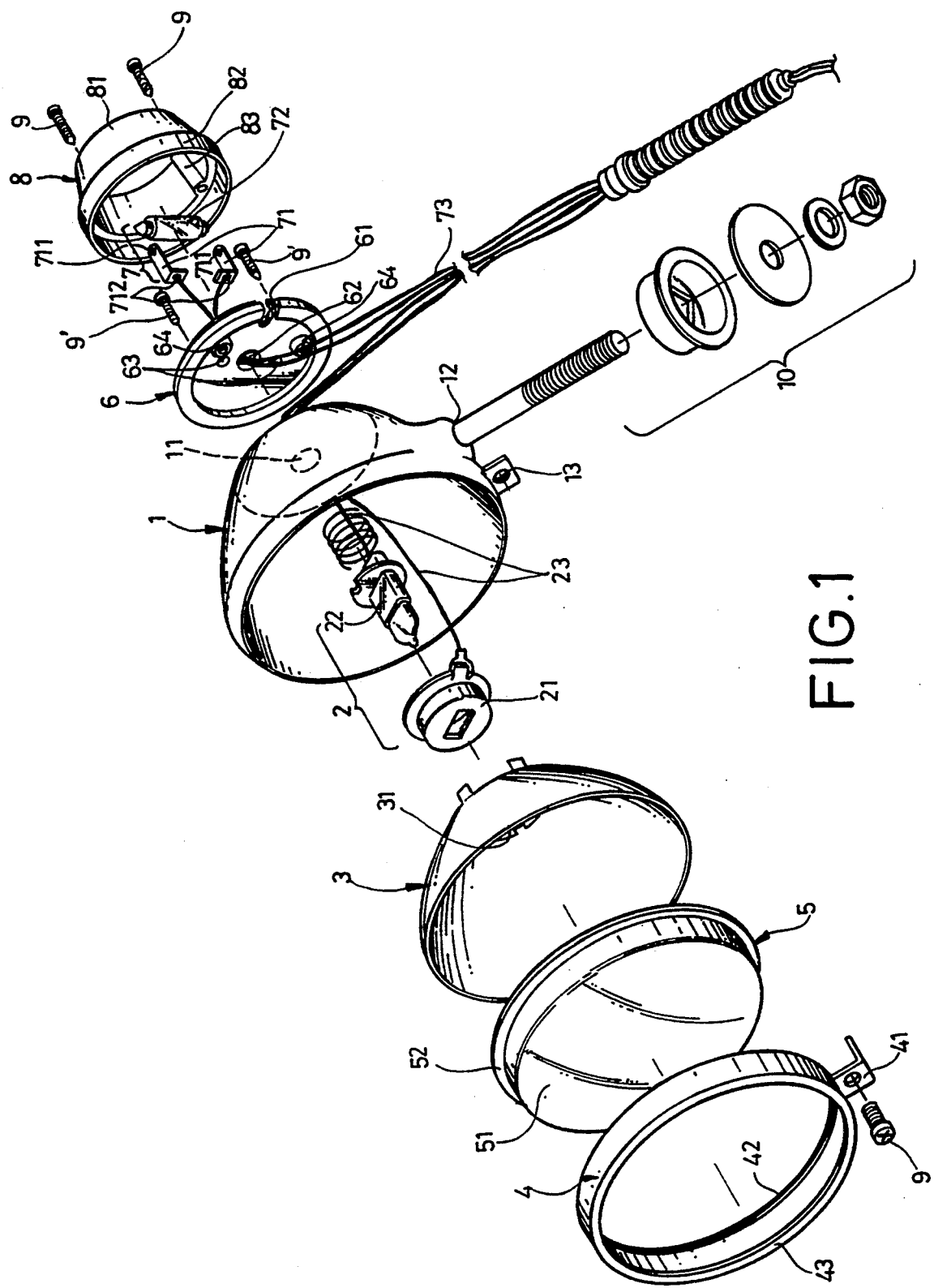
FIG. 1 is an exploded view of an automobile roof lamp and stop lamp assembly according to the preferred embodiment of the present invention.

Referring to FIG. 1, therein illustrated is an automobile roof lamp and stop lamp assembly in accordance with the present invention, generally comprises a lamp case 1, a roof lamp unit 2, a reflector 3, a rim 4, a lens 5, a mounting plate 6, a stop lamp unit 7, and a signal display lamp shade 8. The lamp case 1 is made in the shape of a hollow, rounded container having a wire hole 11, a bottom through hole 12, and a mounting tab 13. The roof lamp unit 2 comprises a lamp holder 21 and a lamp bulb 22. The reflector 3 fits over the inside wall of the lamp case 1, having a back opening 31 corresponding to the wire hole 11 on the lamp case 1. The lens 5 comprises a lens body 51 having a flange 52 around the border fitted into the lamp case 1. The rim 4 comprises a mounting tab 41 fastened to the mounting tab 13 on the lamp case 1 by a screw 9, a front flange 43 around the border at one end, and a rear flange 42 around the border at an opposite end. The inner diameter of the front flange 43 is smaller than that of the rear flange 42. The mounting plate 6 comprises an annular groove 61 around the border, a wire hole 62 in line with the wire hole 11 on the lamp case 1, symmetrical rivet holes 63 and female screw 64 at opposite locations by the wire hole 62. Before fastening the lamp shade 8 to the mounting plate 6, the mounting plate 6 is fastened to the lamp case 1 at the back by screws 9'. The stop lamp unit 7 comprises two L-shaped metal contact plates 71 and a signal lamp bulb 72. Each L-shaped metal contact plate 71 has a mounting hole 711 and a rivet hole 712 on opposite ends. The rivet hole 712 is connected to either rivet hole 63 on the mounting plate 6 through welding. The mounting hole 711 is to hold either end of the signal lamp bulb 72. The signal display lamp shade 8 comprises a shade body 81, a front flange 82 around one end of the shade body 81 fitted into the annular groove 61 on the mounting plate 6, two barrels 83 oppositely disposed on the inside and respectively and longitudinally connected to the female screws 64 on the mounting plate 6 by respective screws 9.

Figure 2:
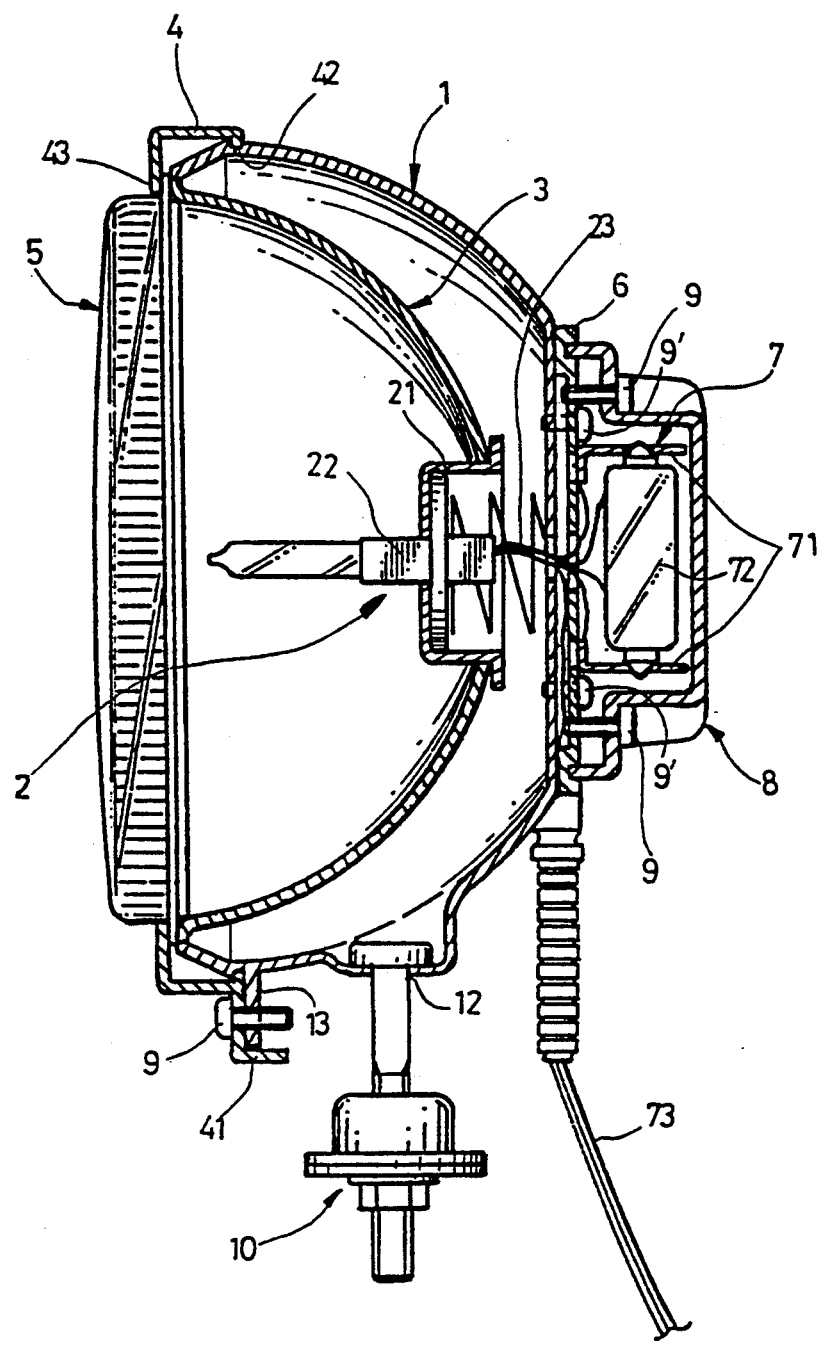
FIG. 2 is an assembly view in section of the automobile roof lamp and stop lamp assembly shown in FIG. 1.

Referring to FIG. 2, a mounting device 10 is fastened to the bottom through hole 12 on the lamp case for mounting the automobile roof lamp and stop lamp assembly on the roof of an automobile; the reflector 3 is received within the lamp case 1 and attached to the inside wall thereof; the conductors 23 of the roof lamp set 2 are extended out of the lamp case 1 through the opening 31 of reflector 3 and the wire hole 11; the mounting tab 41 of the rim 4 is fastened to the mounting tab 13 of the lamp case 1, and the rear flange 42 of the rim 4 covered around the front opening of the lamp case 1; the lens 5 is fastened to the lamp case 1 by the rim 4 with the flange 52 thereof stopped by the front flange 43 of the rim 4; the lamp shade 8 covers on the mounting plate 6; the mounting plate 6 is fastened to the lamp case 1 at the back to hold the stop lamp unit 7 within the lamp shade 8; the signal lamp bulb 72 is connected between the two metal contact plates 71 within the lamp shade 8; the conductors 73 of the stop lamp unit 7 are extended through the wire hole 62 on the mounting plate 6 and connected to the electric circuit control of the automobile.

When installed in the roof of the automobile and electrically turned on, the roof lamp unit 2 produce light for assistance of illumination. As the brake pedal of the automobile is pressed, the stop lamp unit 7 is triggered to give a visual signal for warning the cars from behind. The structure of the present invention can reduce the possibilities of car accidents as low as possible and increase the security of drivers.

What is claimed is:

1. An automobile roof lamp and stop lamp assembly comprising:

a lamp case, said lamp case comprising a back wire hole, a bottom mounting tab, and a bottom connector for mounting on an automobile;

a roof lamp unit including a lamp holder fastened inside said lamp case and a lamp bulb mounted on said lamp holder;

a reflector fitted over the inside wall of said lamp case and being smaller than said lamp case, said reflector having a back opening;

a lens covered on said front opening of said lamp case;

a rim mounted around said front opening of said lamp case to hold said lens in place, said rim having a mounting tab fastened to the mounting tab on said lamp case;

a convex mounting plate fastened to said lamp case at the back, said mounting plate comprising an annular groove around the border, a wire hole in line with the wire hole on said lamp case, two symmetrical rivet holes and a lot of female screws disposed around the wire hole of said mounting plate;

a stop lamp unit mounted on said mounting plate, said stop lamp unit comprising two L-shaped metal contact plates fastened to said mounting plate and a signal lamp bulb connected between the mounting holes of said L-shaped metal contact plates; and a signal display lamp shade comprising a front flange around one end; the signal display lamp shade fastened to said mounting plate by said front flange.

* * * * *